(12) United States Patent
Hoggan (10) Patent No.: US 6,390,289 B1
(45) Date of Patent: May 21, 2002

(54) CONVEYOR BELT ALIGNMENT DEVICE

(76) Inventor: Richard M. Hoggan, 6730 Acoma Rd., Midvale, UT (US) 84047

( * ) Notice: Subject to any disclaimer, the term of this patent is extended or adjusted under 35 U.S.C. 154(b) by 0 days.

(21) Appl. No.: 09/498,572

(22) Filed: Feb. 4, 2000

(51) Int. Cl.[7] .......................... B65G 15/60; B65G 39/16
(52) U.S. Cl. ...................... 198/843; 198/837; 198/198; 198/806; 198/808
(58) Field of Search ................... 198/806, 808, 198/837, 882, 843

(56) References Cited

U.S. PATENT DOCUMENTS

| | | | |
|---|---|---|---|
| 2,609,084 A | 9/1952 | Hersey | |
| 2,725,757 A | * 12/1955 | Murphy | 198/837 |
| 2,743,004 A | 4/1956 | Wright | |
| 2,751,067 A | 6/1956 | Nicholson | |
| 3,278,002 A | 10/1966 | Robins | |
| 3,327,839 A | * 6/1967 | Sigety et al. | 198/840 |
| 3,550,535 A | * 12/1970 | Rooklyn | 198/837 |
| 3,603,451 A | 9/1971 | Promin | |
| 3,710,927 A | 1/1973 | Alsted | |
| 3,805,950 A | 4/1974 | Becker | |
| 3,858,710 A | 1/1975 | Spodig | |
| 3,869,574 A | * 3/1975 | Kume | 198/837 |
| 3,913,729 A | 10/1975 | Andrews | |
| D247,289 S | 2/1978 | Christiansen | |
| 4,173,904 A | 11/1979 | Repetto | |
| 4,351,431 A | 9/1982 | Fenton, Jr. et al. | |
| 4,397,538 A | 8/1983 | Castelli et al. | |
| 4,506,782 A | * 3/1985 | Jeanneret et al. | 198/806 |
| 4,557,372 A | 12/1985 | Rajagopal | |
| 4,982,836 A | 1/1991 | Summers | |
| 5,117,969 A | 6/1992 | Roth | |
| 5,219,063 A | 6/1993 | Wyatt | |
| 5,950,806 A | * 9/1999 | Warneke | 198/806 |

FOREIGN PATENT DOCUMENTS

| | | |
|---|---|---|
| WO | WO 85/04640 | 10/1985 |
| WO | WO 92/06908 | 4/1992 |
| WO | WO 99/38787 | 8/1999 |

* cited by examiner

Primary Examiner—Christopher P. Ellis
Assistant Examiner—Mark A. Deuble
(74) Attorney, Agent, or Firm—Morriss, Bateman O'Bryant & Compagni (57) ABSTRACT

A conveyor belt alignment device comprises an idler roller mounted relative to a conveyor belt, the idler roller having a first cylindrical portion extending over the conveyor belt proximate an edge thereof, and a second cylindrical portion abutting against an edge of the conveyor belt for preventing lateral movement of the conveyor belt relative thereto. The idler roller is biased toward the conveyor belt in a direction substantially perpendicular to a plane defined by an upper surface of the conveyor belt to allow debris to pass between the idler roller and the conveyor belt and thus reduce damage to the conveyor belt.

17 Claims, 5 Drawing Sheets

CONVEYOR BELT ALIGNMENT DEVICE

BACKGROUND

1. Field of the Invention

The field of the invention relates generally to conveyor belt systems, and more specifically to devices employed for maintaining the alignment of endless conveyor belts on a conveyor system, such as those conveyor systems used in the mining, food and package handling industries.

2. Statement of the Art

A typical conveyor system includes a support frame having an upper load carrying portion and a lower return portion. The frame supports a plurality of idler rollers that are configured to carry an endless belt. Material is conveyed on the upper load carrying portion of the conveyor system, while the endless belt is returned along the lower return portion.

Uneven loading, worn or misaligned rollers, or other components of the conveyor system that are out of alignment or imbalanced may cause the belt to wander in a transverse direction relative to the center of the conveyor system. Such misalignment of the belt can result in significant and expensive repairs of the conveyor belt if not quickly corrected. Specifically, with conventional conveyor systems, when the belt wanders to one side, the edge of the belt may be allowed to contact and rub against components of the frame of the conveyor system. If the belt is allowed to scrape against a stationary object such a component of the frame, the belt will become quickly damaged. Such wear along an edge of the belt can result in, for example, delamination of the layers of material comprising the belt and significant removal of material along the edge of the belt.

Replacement of prematurely worn or damaged belts is a relatively expensive procedure both in the man hours required to replace such a belt as well as the expense of the belt itself. In addition, because of the typical long length of such belts, the belt must be removed and replaced in sections. Thus, in order to replace a section, workers must cut and remove the damaged section of belt and splice in a new belt section of the same length. Because of the weight alone of such a belt section, multiple workers must be employed to perform the replacement operation. Additionally, such a section of belt may cost between $1,000 and 50,000.

Devices for maintaining the alignment of continuous belt conveyor systems have been known for decades. For example, in U.S. Pat. No. 3,913,729 to Andrews, a belt aligner comprises a pair of hourglass shaped rollers that can move in a direction transverse to the direction of belt movement in order to force the belt into alignment. The rollers are designed to receive the edge of the belt within a circumscribing channel. One problem known in the industry with such rollers is the tendency for the belt to ride out and over the roller when the belt edge of the belt or the roller itself becomes worn or when debris passes between the roller and the edge of the belt.

Similar problems exist with the devices shown in U.S. Pat. No. 2,609,084 to Hersey and U.S. Pat. No. 3,278,002 to Robins, the belt can easily ride up and over the roller. Furthermore, devices, such as that shown by Robins, require complex systems to operate. Robins requires a separate hydraulic system to be installed in conjunction with the conveyor system. Additionally, Hersey requires a pivoting subassembly to allow the entire belt support structure to pivot in order to encourage proper alignment of the belt.

Thus, such prior art systems require significant retrofitting to existing conveyor belt systems or installation of completely new conveyor systems in order to obtain the claimed benefits of such belt training devices.

Accordingly, it would be advantageous to provide a belt alignment device for use on both existing continuous belt conveyor systems and newly constructed belt conveyor systems that is relatively easy and inexpensive to manufacture, can be easily installed on existing conveyor systems, and provides significantly better belt alignment than other devices known in the art.

SUMMARY OF THE INVENTION

In accordance with the present invention, a conveyor belt alignment device is provided which comprises an idler roller rotatably attached to a mounting bracket. The idler roller has a first substantially cylindrical portion extending over an upper surface of the conveyor belt proximate the edge of the belt and a second substantially cylindrical portion having a diameter greater than the first cylindrical portion abutting against the edge of the conveyor belt. For a given conveyor system, a plurality of idler rollers are attached to the conveyor system over the rollers which support the endless conveyor belt. That is, the belt is effectively sandwiched between the idler rollers and the support rollers of the conveyor system.

Preferably, the idler rollers are rotatably mounted to the mounting bracket with an elongate axle extending through the idler roller. The axle comprises an elongate shaft having a first externally threaded end, a second externally threaded end and a central non-threaded portion. The non-threaded portion has a length greater than a longitudinal length of the idler roller and a diameter that prevents the threaded fasteners from advancing beyond the threads of the shaft. As such, when the idler roller is attached to the elongate shaft, the idler roller can freely rotate relative to the shaft even when the threaded fasteners are fully engaged upon the shaft.

Because a portion of the idler roller of the present invention rides on top of the endless belt of a conveyor system, debris will necessarily pass between the belt and the roller. In order to accommodate such debris while minimizing damage to the belt, as may be the case if the roller were rigidly held against the belt, the idler roller is provided with a biasing device, such as a coil spring, to allow movement of the idler roller away from the belt (i.e., in a direction substantially perpendicular to a plane defined by an upper surface of the belt). As such, the idler roller forces the belt against its respective carrying roller in order to hold and maintain the belt in proper alignment.

In a preferred embodiment, a mounting arm is attached proximate a first end thereof to a conveyor system and has a second end extending to proximate an edge of the conveyor belt. An L-shaped mounting bracket attaches the idler roller to the mounting arm. A biasing device is coupled between the mounting arm and the mounting bracket for biasing the idler roller toward an upper surface of the conveyor belt.

In yet another preferred embodiment, the idler roller is comprised of a cylindrically shaped wheel having a first portion with a first diameter for riding upon the upper surface of the belt and a second portion for abutting against the edge of a belt of a conveyor system. In addition, the difference between the first diameter and the second diameter is less than a thickness of the conveyor belt. As such, the second portion is prevented from contacting the carrying roller which would cause undesirable wear of the carrying roller.

In yet another preferred embodiment, the first and second portions of the idler roller comprise an integral wheel. The wheel is provided with an axle for rotatably mounting the wheel to a mounting bracket. In addition, the axle further defines an elongate bore extending at least partially through the axle for providing a pathway for grease to be applied between the wheel and the axle.

In still another preferred embodiment, the first portion of an idler roller mechanism comprises a first roller configured for extending over and rolling against an upper surface of the conveyor belt proximate an edge thereof, and a second roller oriented approximately ninety degrees from the first roller and configured for rolling against the edge of the conveyor belt. Preferably, the second roller is spaced below the first roller a distance less than a thickness of the conveyor belt so that the second roller does not contact the carrying roller when in operation.

When the belt training idler rollers of the present invention are used in conjunction with a belt conveyor system, such as the belt conveyor systems disclosed in U.S. Pat. Nos. 2,399,913 to Dodge, U.S. Pat. No. 2,488,859 to Garbed, U.S. Pat. No. 2,561,641 to Thomson, U.S. Pat. No. 2,609,084 to Hersey, U.S. Pat. No. 2,743,004 to Wright, U.S. Pat. No. 3,278,002 to Robins, and U.S. Pat. No. 4,351,431 to Benton, Jr. et al. each herein incorporated by this reference as well as other belt conveyor systems known in the art, a plurality of such belt training idler rollers are attached at various points along the path of the belt. More specifically, when the belt conveyor system includes a support structure, a plurality of carrying idler rollers coupled to the support structure for supporting a feed path of the endless conveyor belt, and a plurality of return idler rollers coupled to the support structure supporting a return path of the endless conveyor belt, a plurality of belt training rollers are coupled to the support structure proximate an edge of the endless conveyor belt and are positioned above each of the carrying idler rollers. The belt training rollers are configured to compress a portion of the endless conveyor belt proximate an edge thereof between the belt training rollers and the carrying idler rollers. In addition, a plurality of belt training rollers are coupled to the support structure proximate an edge of the endless conveyor belt above each of the return idler rollers in a manner similar to the belt training rollers attached relative to the carrying rollers.

BRIEF DESCRIPTION OF THE ILLUSTRATIONS

In the drawings, which illustrate what is currently considered to be the best mode for carrying out the invention.

DETAILED DESCRIPTION OF THE INVENTION

Figure 1:
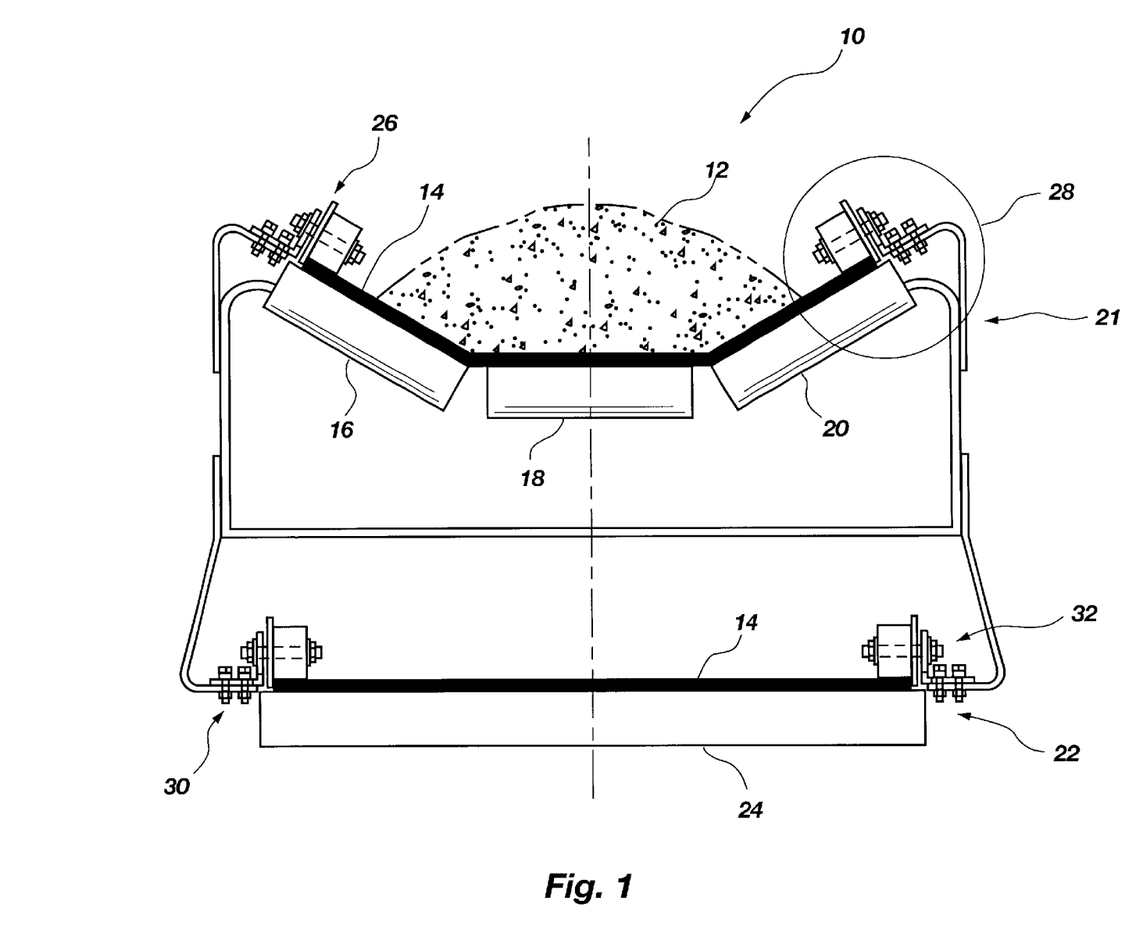
FIG. 1 is a partial cross-sectional front view of a belt conveyor system illustrating a first preferred embodiment of a plurality of belt training idler rollers attached thereto in accordance with the principles of the present invention.

FIG. 1 is a partial cross-sectional view of a typical conveyor belt system, generally indicated at 10, such as the type used in the mining industry for transporting loose material such as coal 12. The conveyor belt system generally comprises an endless conveyor belt 14 carried by a plurality of idler carrying rollers 16, 18 and 20 that are configured to curve or bend the belt 14 into a U-like shape to contain the coal 12 therein and thus prevent the coal 12 from spilling over the outer edges of the belt 14. The conveyor belt system 10 also includes a belt return, generally indicated at 22, in which the belt 14 is carried by a single flat roller 24. Of course, the conveyor belt system 10 includes a plurality of such roller arrangements (i.e., carrying and return roller arrangements) such as that shown in FIG. 1 being spaced every 3 to 10 feet along the length of the belt 14.

As previously discussed with respect to prior art belt training device, a major problem encountered with such conveyor belt systems, such as the conveyor belt system 10, is the tendency for the belt 14 to wander or become misaligned relative to the rollers 16, 18 and 20 and/or the return roller 24. In order to maintain belt 14 alignment, the present invention provides belt alignment devices 26, 28, 30 and 32 that are configured to be relatively easily and inexpensively installed onto existing conveyor systems and are relatively easy and inexpensive to manufacture. Preferably, each belt alignment or belt training device 26, 28, 30 and 32 is positioned over a respective carrying or return roller 16, 18 and 24. As such, the alignment devices 26, 28, 30 and 32 can hold and maintain the position of the belt 14 relative to the rollers 16, 20 and 24 by pressing the belt 14 against the rollers 16, 20 and 24 as the case may be. Furthermore, each alignment device 26, 28, 30 and 32 prevents the belt 14 from moving in a direction transverse to the line of movement of the belt 14. Preferably, belt alignment devices 26, 28, 30 and 32 are dispersed along the path of the belt at various intervals so as to maintain the alignment of the belt 14 along its entire length both on the carrying 21 portion and the return portion 22.

Figure 2:
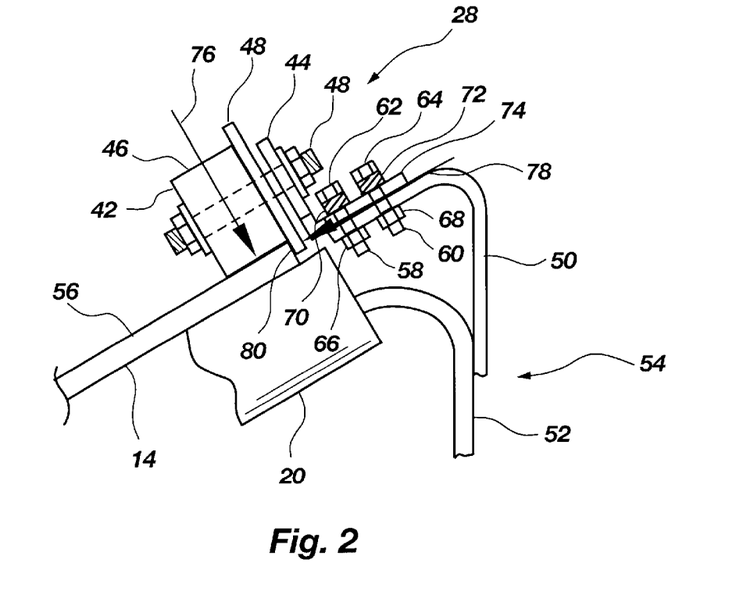
FIG. 2 is a partial cross-sectional front view of one of the belt training idler rollers shown in FIG. 1 relative to the belt conveyor system.

Referring now to FIG. 2, the belt alignment device, generally indicated at 28, illustrated in FIG. 1 is shown in closer detail. The belt alignment device 28 is comprised of an idler roller or wheel 42 rotatably mounted to an "L" shaped mounting bracket 44. The wheel 42 has a first portion 46 and a second portion 48 that may be formed from a single integral part or two separate parts abutted together. The first portion 46 has a smaller diameter than the second portion but is preferably relatively wider. The wheel 42 is provided with a central bore and is mounted to the mounting bracket 44 with a shaft or axle 48 inserted through the central bore so that the wheel 42 can freely rotate relative to the axle 48.

The mounting bracket 44 is biasly attached to a mounting arm 50 which is coupled to the support structure or frame 52 of the belt conveyor assembly, generally indicated at 54. The mounting arm 50 orients the mounting bracket 44 and the wheel 42 so that the first portion 46 of the wheel 42 rides relatively flat against the upper surface 56 of the belt 14. The mounting bracket 44 is mounted to the mounting arm 50 with biasing devices 58 and 60 respectively comprising threaded bolts 62 and 64, nuts 66 and 68, and coil springs 70 and 72 interposed between the heads of the bolts 62 and 64 and the upper surface 74 of the mounting bracket 44. As such, the mounting bracket 44 and thus the wheel 42 is biased in a direction substantially parallel to the arrow 76 which is substantially perpendicular to a plane defined by the upper surface 56 of the belt 14. By allowing the wheel 42 to move in a direction opposite to arrow 76 during operation of the belt 14, debris (not shown) can pass between the wheel 46 and the upper surface 56 of the belt 14 without damaging the belt 14 or causing damage to the belt alignment device 28.

Additionally, the mounting arm 50 may provide bias to the wheel 42 in a direction substantially parallel to a plane defined by the upper surface 56 of the belt 14 as indicated by arrow 78. Such biasing may be provided by fixedly attaching the arm 50 to the frame 52 and forming the arm 50 from a resilient material such as spring steel to operate in a manner similar to a leaf spring or by bias mounting the arm 50 to the frame 52 in a manner similar to the way the bracket 44 is mounted to the arm 50.

As further illustrated in FIG. 2, the diameter of the wheel portion 46 is less than the diameter of the wheel portion 48 so that the belt 14 can nest between the carrying roller 20 and the wheel 42 to limit or substantially prevent movement of the belt 14 in a direction opposite to the arrow 78. Thus, when properly installed, the wheel portion 48 is abutted against the outer edge 80 of the belt 14 in a position where the belt 14 is properly aligned relative to the roller 20. Additionally, the difference between the diameters of the wheel portion 46 and the wheel portion 48 is less than the thickness of the belt 14. Accordingly, the belt 14 holds the wheel portion 48 away from the roller 20 so that the wheel portion 48 does not undesirably wear the roller 20.

Figure 3:
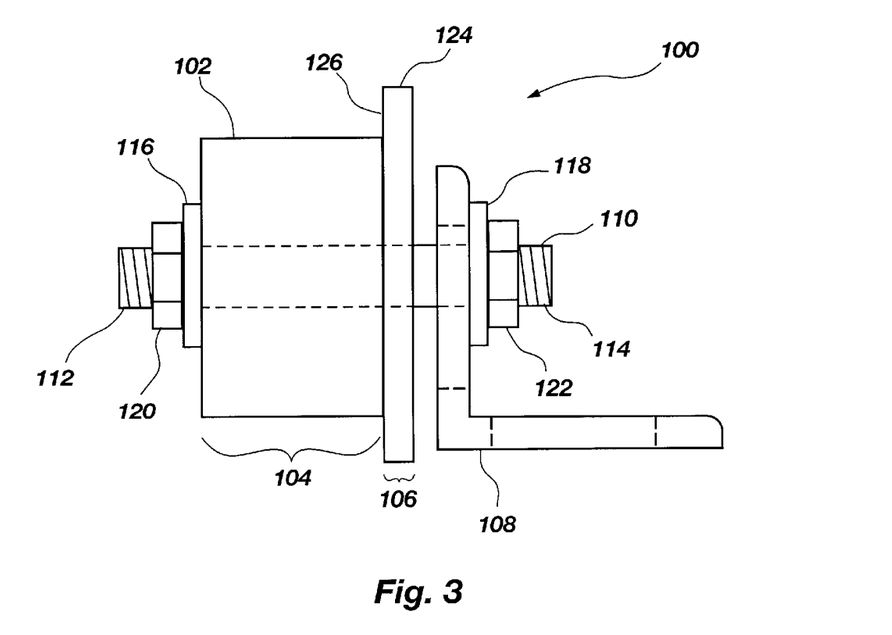
FIG. 3 is a schematic front view of a second preferred embodiment of a belt alignment device in accordance with the principles of the present invention.

Referring now to FIG. 3, a belt alignment device, generally indicated at 100 is comprised of an integral idler roller 102 having a substantially cylindrical portion 104 having a smaller diameter and larger longitudinal length than a substantially disk-like portion 106. Preferably, the difference in diameters between the portions 104 and 106 is less than the thickness of the belt (not shown) to which the belt alignment device 100 is designed to be attached.

The idler roller 102 is rotatably attached to an "L" shaped mounting bracket 108 with an elongate axle 110 which is threaded on both ends 112 and 114. The idler roller 102 is mounted to the axle 110 with nuts 120 and 122 and is provided with washers 116 and 118 interposed between the nut 120 and the wheel 102 and between the nut 122 and the mounting bracket 108, respectively, to reduce friction between these components upon rotation of the idler roller 102.

When installed onto a belt conveyor system, the idler roller 102 effectively clamps the belt of the conveyor system between the idler roller 102 and a roller of the conveyor system. Furthermore, as previously discussed, the portion 106 of the idler roller 102 has a diameter that provides a gap between the outer edge 124 of the portion 106 and the surface of an associated roller of a conveyor system so that the portion 106 does not wear the associated roller. When properly installed, the idler roller 102 is mounted relative to the conveyor belt so that the inside surface 126 of the portion 106 abuts against and thus maintains the position of the edge of the belt. Furthermore, the bracket 108 is configured to be bias mounted to the frame of the belt conveyor system to allow the idler roller 102 to travel away from the belt so that debris can pass between the idler roller 102 and the belt and also to maintain a desired amount of compression on the belt to help maintain belt alignment during operation of the conveyor system. As such, the idler roller 102 maintains the position of the belt in both a horizontal and vertical directions (such directions being relative to a plane defined by an upper surface of an associated conveyor belt).

Figure 4:
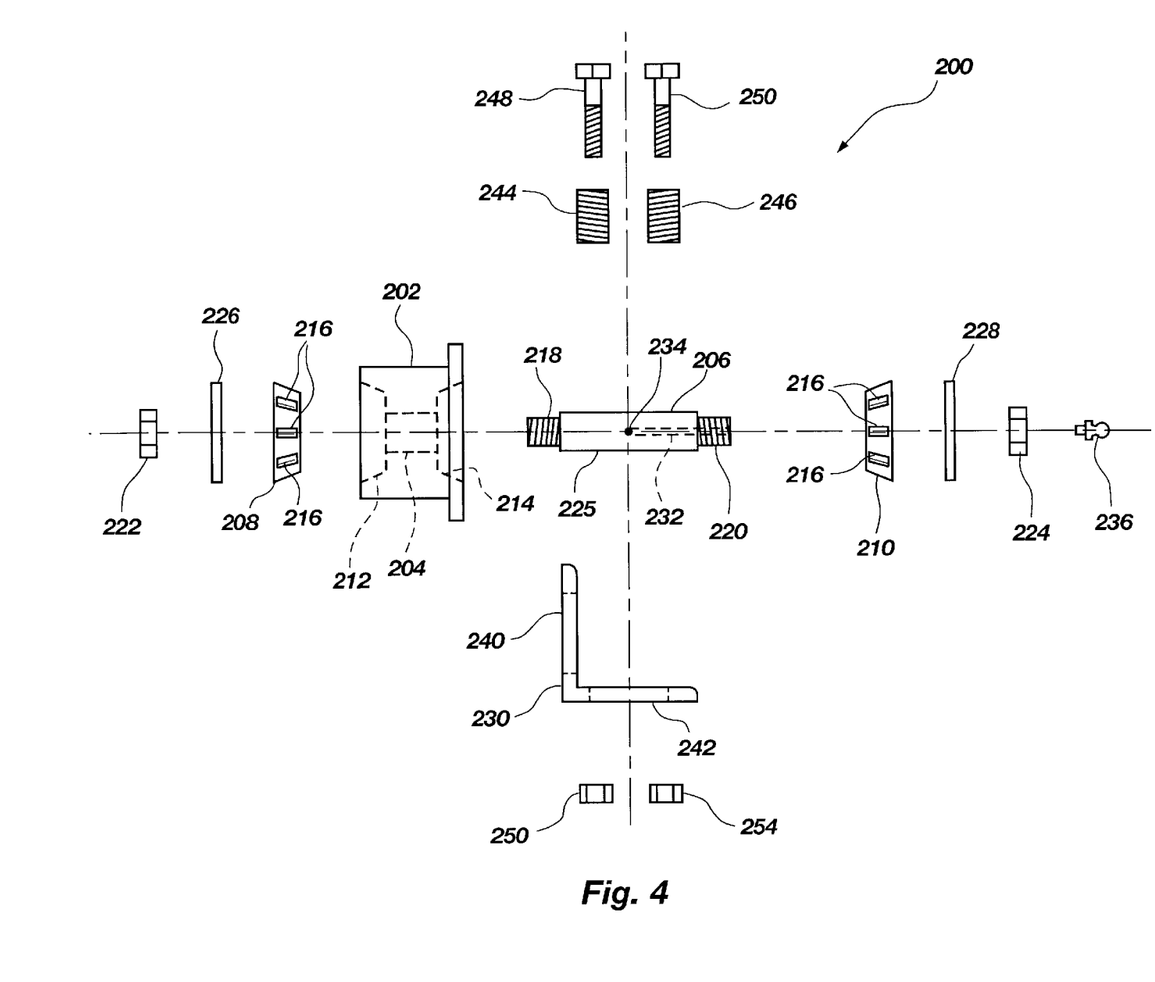
FIG. 4 is an exploded front view of a third preferred embodiment of a belt alignment device in accordance with the principles of the present invention.

FIG. 4 shows an exploded view of a belt alignment device, generally indicated at 200, configured to train a conveyor belt (not shown) when properly attached relative thereto. Of course, as previously discussed a plurality of such belt alignment devices 200 would be placed along both sides of the belt at desired intervals, such as at the location of each set of idler rollers of the conveyor belt system. The belt alignment device 200 is comprised of an idler roller 202 having an outer configuration similar to the previous preferred embodiments herein described and means in which to rotatably mount the idler roller 202 to a belt conveyor system (not shown). The idler roller 202 defines a longitudinally extending bore 204 sized for receiving an elongate shaft or axle 206. The idler roller 202 is designed to be freely rotatable upon the axle 206 and is rotatably secured thereto with a pair of frustoconically shaped bearings 208 and 210 which are configured to seat within frustoconically shaped receiving recesses or races 212 and 214, respectively, defined by the idler roller 202. The bearings 208 and 210 may be provided with a plurality of freely rotatable bearings 216 that can seat within the races 212 and 214 and allow ration of the idler roller 202 relative to the bearings 208 and 210.

The axle 206 is provided with threaded ends 218 and 220 for receiving threaded fasteners 222 and 224, respectively, and includes an elongate central portion 225 having a length that allows the bearings 208 and 210 to be properly tightened relative to the idler roller 202 (i.e., to provide free rotation of the idler roller 202 without significant movement of the idler roller in a direction in line with the longitudinal length of the shaft 206). As such, the central portion 225 of the shaft 206 may be longitudinally longer than, shorter than or equal to the longitudinal length of the idler roller 202. When the idler roller 202 is assembled to the axle 206, the axle is slide into the bore 204, the bearings 208 and 210 are fitted within the recesses 212 and 214, respectively, the washer 226 is abutted against the bearing 208, the mounting bracket 230 and washer 228 are placed on the end 202 of the axle 206 and the fasteners 222 and 224 are threaded upon the ends 218 and 220, respectively, of the axle 206 until the fasteners 222 and 224 abut against the central unthreaded portion 225 of the axle 206 or until the bearings 208 and 210 are properly seated within the races 212 and 214 without being over tightened. It is also contemplated that bearing seals (not shown) be provided to keep grease contained within the bearings while preventing dirt, debris or other contaminates from entering the bearing surfaces and thus increasing the friction resulting from rotation of the idler roller 202. Likewise, the alignment device 200 may have a "sealed-for-life" configuration, in which grease is "permanently" sealed within the bearings and the bearings are sealed to prevent contaminates from entering the bearings.

The axle 206 is also provided with a central bore or passageway 232 extending from the end 220 and terminating in an opening 234 in the unthreaded portion 225 of the axle 206. The passageway 232 is provided with internal threads at the proximal end thereof for threadedly receiving a grease fitting 236 so that the axle 206, idler roller 202 and bearings 208 and 210 can be properly lubricated during use to prevent excessive wear on the moving components of the belt alignment device 200.

The mounting bracket 230 has a generally "L" shaped configuration and includes a first elongate slot 240 for selectively mounting the idler roller 202 at a desired height relative to the mounting bracket 230 and a second elongate slot 242 for attaching the mounting bracket 230 to a conveyor system. Additionally, a pair of biasing members 244 and 246 a provided to biasly mount the bracket 230 to the conveyor system. The biasing members 244 and 246 comprise a pair of coil springs that can be mounted relative to the mounting bracket 230 with a corresponding pair of bolts 248 and 250 and threaded fasteners 252 and 254. Preferably, the bolts 248 and 250 are inserted through the springs 244 and 246, respectively, inserted through the slot 242 of the mounting bracket 230 and secured relative thereto with threaded fasteners (i.e., nuts) 250 and 254.

Figure 5:
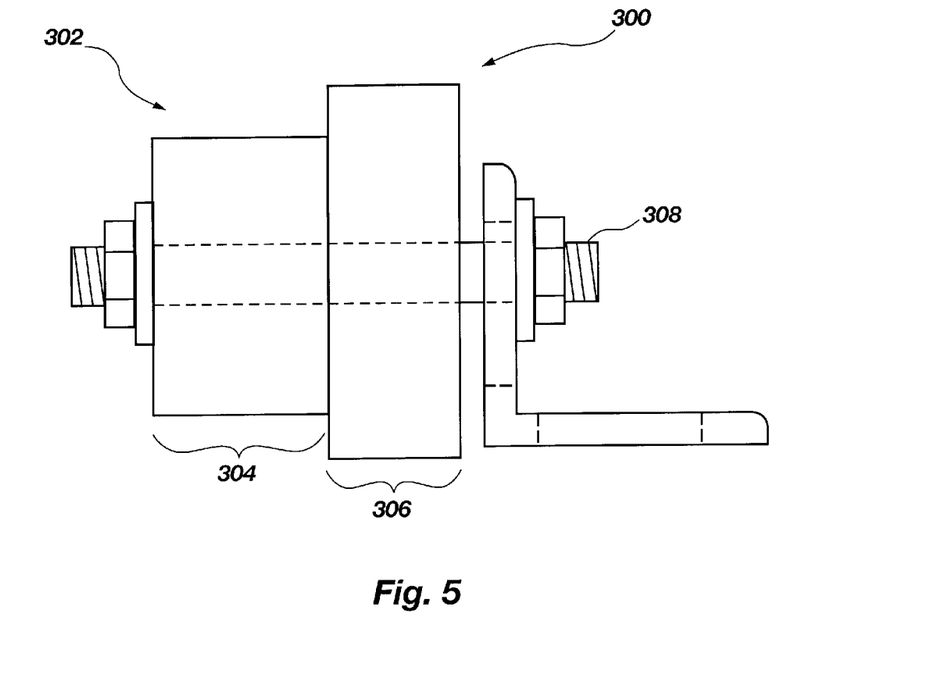
FIG. 5 is a schematic front view of a fourth preferred embodiment of a belt alignment device in accordance with the principles of the present invention.

FIG. 5 illustrates yet another preferred embodiment of a belt training device, generally indicated at 300, in accordance with the present invention. The belt training device 300 is similar in configuration to the device shown in FIG. 3 except that the idler roller, generally indicated at 302, is a two piece idler roller having a first cylindrical portion 304 and a second cylindrical portion 306. The second cylindrical portion 306 is made substantially wider than the corresponding portion of the device shown in FIG. 3 since it is not supported by attachment to the first portion 304. As such, in order to limit wobbling of the second portion 306 relative to the axle 308, the second portion 306 is wide enough to gain lateral stability when rotating about the axle 308. That is, a thin disk-like member would tend to wobble when rotated about the axle 308 if not provided with some other lateral support. As such, the belt training device may be comprised of one or more independently rotatable wheels.

Figure 6:
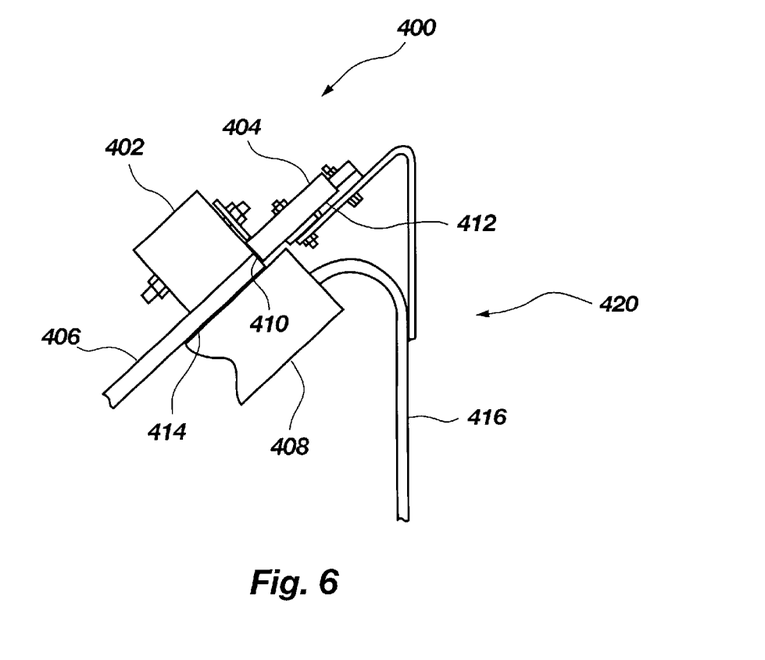
FIG. 6 is a partial cross-sectional front view of a fifth preferred embodiment of a belt alignment device in accordance with the principles of the present invention.

FIG. 6 illustrates still another preferred embodiment of a belt training device, generally indicated at 400, in accordance with the principles of the present invention. In this embodiment, the belt training device 400 is comprised of a pair of idler rollers 402 and 404. The first idler roller 402 is placed on top of the belt 406 to "clamp" or hold the belt against the carrying roller 408. As such, the idler roller 402 is preferably positioned over the carrying roller 408. The second idler roller 404 is oriented ninety degrees from the orientation of the first idler roller 402 and positioned relative to the belt 406 to rotate against the edge 410 of the belt 406. Furthermore, the bottom end 412 of the second idler roller 404 is spaced above the surface 414 of the carrying roller 408 so that the second idler roller 404 does not contact the carrying roller 408. As with the other embodiments, provided herein one or both of the idler rollers 402 and 404 may be biasly mounted relative to the frame 416 of the conveyor system, generally indicated at 420, to allow debris to pass between the rollers 402 and 404 and the belt 406 without significantly damaging the belt 406.

Figure 7A:
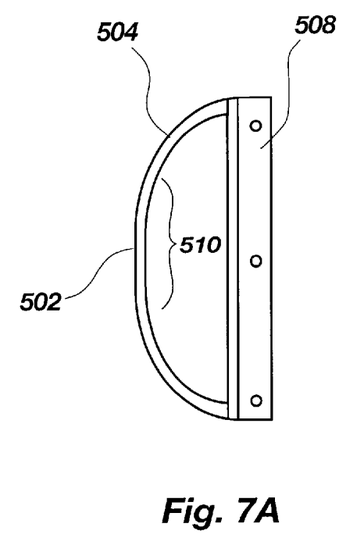
FIGS. 7A and 7B show top and side views, respectively, of a static slide in accordance with the principles of the present invention.
Figure 7B:
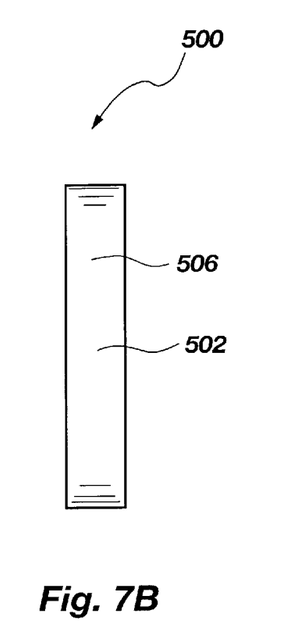

It is further contemplated that the roller 404, shown in FIG. 6, may comprise a static slide 500 as shown in FIGS. 7A and 7B in which the slide 500 is not a roller but merely provides a smooth abutment surface 502 to keep the belt laterally aligned. Such a static slide 500, may be in the shape of an elongate flat or curved plate 504 having a polished or otherwise smooth surface 506 against which the edge of the belt can ride. The static slide 500 may include a mounting member or bracket 508 for mounting in a similar manner as other embodiments herein. Because of its configuration, the plate 504 may provide some biasing to a belt riding against it in that the central portion 510 may be able to flex inwardly to encourage the belt into proper alignment without damaging the belt.

Figure 8:
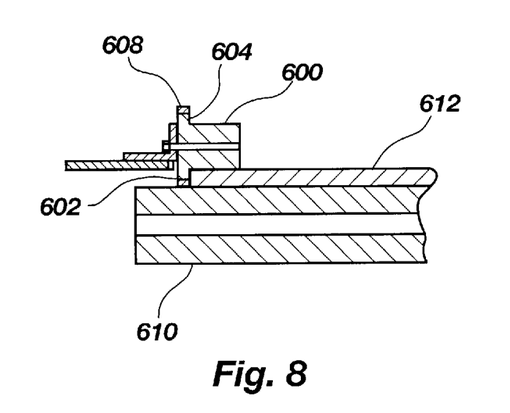
FIG. 8 is a cross-sectional side view of a sixth preferred embodiment of a belt alignment device in accordance with the principles of the present invention.

Referring now to FIG. 8, a rolling idler 600 is configured similar to other rolling idlers described herein, except that the outer perimeter 602 of the larger diameter portion 604 is encompassed or covered with a ring 608 of a less abrasive, elastic material, such as rubber. Preferably the durometer of the ring 608 is less than that of the roller 610. The ring 608 is provided to contact the roller 610 of the conveyor system and thus encourage roll of the rolling idler 600 upon movement of the belt 612. It is also contemplated that the idler roller 600 may be configured without the ring 608. In addition, the diameter of the larger diameter portion 604 may be such that the perimeter 602 contacts the roller 610. Having a rubber ring 608, however, will allow the idle roller 600 to be biased away from the roller 610 as described with respect to other embodiments herein while maintaining contact with the roller 610.

Figure 9:
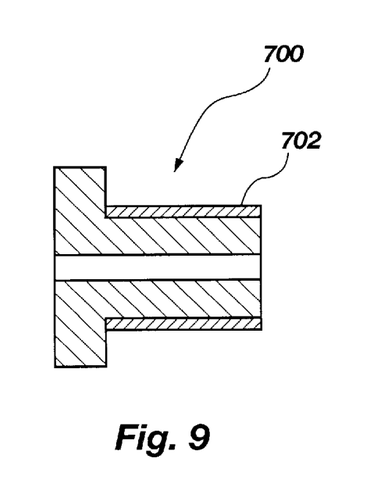
FIG. 9 is a cross-sectional side view of a seventh preferred embodiment of a belt alignment device in accordance with the principles of the present invention.

As further illustrated in FIG. 9, an idler roller 700 is configured in a similar manner to other preferred embodiments of idler rollers described herein except that the idler roller is provided with a resilient sleeve 702. The sleeve 702 may be comprised of a material such as rubber, preferably of a softer durometer than the material of the roller of the conveyor system. With such a resilient sleeve 702, the biasing features previously described may be replaced or augmented. That is, debris may be allowed to pass between the roller 700 and the belt (not shown). Furthermore, the sleeve may provide an added benefit when the belt becomes wet. Forming the sleeve 702 from a material that resists slippage will help to keep the idler roller 700 rotating when the belt becomes wet, thus reducing wear of the belt that may otherwise occur if the roller 700 remained stationary while the belt was advancing.

Preferably, the idler rollers of the present invention are formed from steel or other metals or metal alloys. Additionally, however, the idler rollers may be comprised of a relatively hard durometer rubber or other non-metal materials known in the art that exhibit good wear properties. For example, the idler rollers of the present invention may be formed from the same materials as the carrying and return rollers found on belt conveyor systems known in the art.

The belt alignment device of the present invention is structured to quickly and easily install on existing conveyor systems or be incorporated into the construction of new conveyor systems. As such, the belt alignment device may be adapted to any number of conveyor systems that may now exist or be later developed. Thus, reference herein to specific details of the illustrated embodiments is by way of example and not by way of limitation. It will be apparent to those skilled in the art that many modifications of the basic illustrated embodiment may be made without departing from the spirit and scope of the invention as recited by the claims.

What is claimed is:

1. An apparatus for aligning a belt of a conveyor system, comprising:
   a mounting bracket; and
   an idler roller rotatably attached to said mounting bracket, said idler roller having a first cylindrical portion and a second cylindrical portion, said first cylindrical portion having a first diameter and configured to extend over an upper surface of a conveyor belt and said second cylindrical portion having a second diameter greater than said first diameter and configured to abut against an outer edge of the conveyor belt and extending below the upper surface of the conveyor belt.

2. The apparatus of claim 1, further including an elongate axle extending through said idler roller for rotation of said idler roller upon said axle and for mounting said idler roller to said mounting bracket.

3. The apparatus of claim 2, wherein said elongate axle comprises an elongate shaft having a first externally threaded end and a second externally threaded end and a central non-threaded portion, whereby said non-threaded portion has a length greater than a longitudinal length of said idler roller.

4. The apparatus of claim 3, further including first and second internally threaded fasteners configured for threaded engagement with said first and second externally threaded ends, respectively, of said elongate axle for rotatably attaching said idler roller to said mounting bracket.

5. The apparatus of claim 1, further including at least one biasing device for biasly mounting said mounting bracket to a conveyor system.

6. The apparatus of claim 5, wherein said at least one biasing device comprises a pair of coil springs mounted between said mounting bracket and said conveyor system to allow movement of said idler roller in a direction substantially perpendicular to a plane defined by an upper surface of the belt.

7. The apparatus of claim 1, further including a mounting arm attached proximate a first end thereof to a conveyor system and having a second end extending to proximate an edge of the conveyor belt configured for mounting said mounting bracket thereto.

8. The apparatus of claim 7, further including at least one biasing device coupled between said mounting arm and said mounting bracket for biasing said idler roller toward an upper surface of the conveyor belt.

9. The apparatus of claim 1, wherein the difference between said first diameter and said second diameter is less than a thickness of the conveyor belt.

10. An apparatus for training a conveyor belt, comprising:
an idler roller mechanism having a first portion for rolling engagement with an upper surface of a conveyor belt adjacent an outer edge thereof and a second portion for engaging the outer edge of the conveyor belt, said first and second portions of said idler roller mechanism comprising an integral wheel, said first portion having a first diameter smaller than a second diameter of said second portion, the difference between said first and second diameters being less than a thickness of the conveyor belt; and
a biasing device coupled to said idler roller mechanism for biasing said first portion of said idler roller mechanism in a direction substantially perpendicular to a plane defined by an upper surface of the conveyor belt.

11. The apparatus of claim 10, further comprising a mounting bracket configured for mounting said idler roller mechanism relative to a conveyor belt system and wherein said biasing device comprises a spring biasly coupling said mounting bracket to said conveyor belt system.

12. The apparatus of claim 11, further including an axle for rotatably mounting said idler roller mechanism to said mounting bracket.

13. The apparatus of claim 12, wherein said axle further defines an elongate bore extending at least partially through said axle for providing grease between said idler roller mechanism and said axle.

14. A conveyor belt system, comprising:
an endless conveyor belt;
a support structure;
a plurality of carrying idler rollers coupled to said support structure supporting a feed path of said endless conveyor belt;
a plurality of return idler rollers coupled to said support structure supporting a return path of said endless conveyor belt;
a first plurality of belt training rollers coupled to said support structure proximate an outer edge of said endless conveyor belt, positioned above each of said plurality of carrying idler rollers, and compressing a portion of said endless conveyor belt proximate an edge thereof between said first plurality of belt training rollers and said plurality of carrying idler rollers, said plurality of belt training rollers each comprising a first cylindrical body portion extending over an upper surface of said endless conveyor belt and a second cylindrical body portion abutting against said outer edge of said endless conveyor belt.

15. The apparatus of claim 14, further comprising a plurality of mounting devices, each for attaching one of said first plurality of belt training rollers to said support structure, each of said plurality of mounting devices comprising a first mounting bracket rotatably attached to one of said first plurality of belt training rollers, a second mounting bracket fixedly attached to said support structure and biasly attached to said first mounting bracket.

16. The apparatus of claim 15, wherein said first and second mounting brackets are biasly attached with a pair of threaded fasteners and a pair of coil springs mounted to said pair of threaded fasteners in a manner which biases said first mounting bracket relative to said second mounting bracket in a direction substantially perpendicular to a plane defined by an upper surface of said endless belt.

17. The apparatus of claim 14, further including a second plurality of belt training rollers coupled to said support structure proximate an edge of said endless conveyor belt, positioned above each of said plurality of return idler rollers, and compressing a portion of said endless conveyor belt proximate an edge thereof between said second plurality of belt training rollers and said plurality of return idler rollers, said second plurality of belt training rollers each comprising a first cylindrical body portion extending over an upper surface of said endless conveyor belt along said return path and a second cylindrical body portion abutting against said edge of said endless belt.

* * * * *